May 3, 1949.　　　　S. L. GALVIN　　　　2,468,744
PACKAGED FOOD COMPOSITION
Filed April 24, 1945
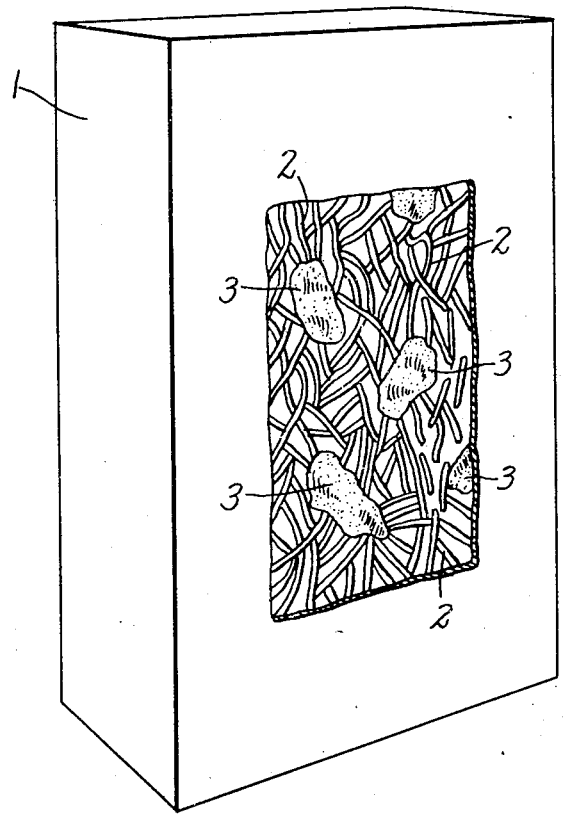
INVENTOR
Stephen L. Galvin
BY
Blair, Curtis + Hayward
ATTORNEYS Patented May 3, 1949

2,468,744

UNITED STATES PATENT OFFICE 2,468,744

PACKAGED FOOD COMPOSITION

Stephen L. Galvin, North Bergen, N. J., assignor to Continental Foods, Inc., Hoboken, N. J., a corporation of Illinois Application April 24, 1945, Serial No. 589,956

3 Claims. (Cl. 99—171)

This invention relates to food compositions adapted to make soup by addition of water.

Such soup base compositions commonly contain amino acid material and a carbohydrate, e. g., sugar, starch, etc. Upon storage, darkening of the base occurs due to chemical reaction between the carbohydrate material with the amino acid material. A great deal of effort has been expended in attempting to overcome this difficulty and the principal object of the invention is to provide a commercially satisfactory solution of the problem.

I have found that by holding an abnormally low moisture content such darkening can be avoided; but the soup base composition is difficult to dry without impairing color or flavor or both.

According to the present invention, such darkening of the soup base is inhibited by maintaining the moisture content at not above about 1.5 per cent, and in accordance with the invention the moisture content is controlled by pre-drying another ingredient in the package which is not sensitive to heat or oxidation. I have found that the cereal products employed in most such soups, such as noodles, barley, rice, peas, lentils, pea flour, bean flour, etc., if sufficiently dried, e. g. to a moisture content not exceeding about 8 per cent by weight in the case of noodles, and placed in a sealed container with the soup base, act as absorbents to take up any excess moisture in the soup base as well as any moisture which may get into the package, whether as humidity in the air at the time of packing or by slow diffusion through the package. Thus the soup base can readily be maintained below the stated critical moisture content of about 1.5 per cent by weight.

In the accompanying drawing is shown in diagrammatic perspective, and partially broken away to disclose the contents, a sealed package of a soup composition embodying the invention. As shown in this drawing, one or more masses of soup base 3 in a mass of a granular cereal product, illustrated as noodles 2, enclosed in a container 1, which is sealed in any suitable manner so as substantially to prevent access of the atmosphere to the contents of the package. The soup base in a preferred example of the invention has a composition as follows:

| | Per cent by weight |
|---|---|
| Sugar, e. g. dextrose | 32 |
| Monosodium glutamate | 15 |
| Vegetable protein hydrolysate | 2 |
| Fats | 20 |
| Salt, spices, etc. | 31 |
| | 100 |

The noodles 2 are dried to a moisture content of less than 8 per cent by weight, e. g., 6 per cent, and the soup base to a moisture content less than 1.5 per cent, e. g., 0.75 per cent by weight. These materials are then subjected to a packaging operation, e. g., as described in Patents Nos. 2,357,585 and 2,341,340, this packaging being done in an atmosphere of about 50% relative humidity and about 75° F. The two materials are proportioned so that each package will contain proportions of cereal and base adapted to provide a suitable noodle soup when the contents are treated by the usual process of heating with water.

The invention is not limited by any theory. However, it may be postulated that the cereal product having a moisture content not exceeding about 8 per cent by weight maintains in the sealed package a vapor pressure of water such that equilibrium is attained between that pressure and the moisture content of the soup base at not exceeding about 1.5 per cent which is the approximate maximum critical value at or below which darkening of said base due to reaction between the amino acid material and the carbohydrate (sugar, starch, etc.) in the soup base is inhibited and color stability therefore attained.

In commercial practice, it may be and often is necessary to expose the cereal product and soup base to the atmosphere between the drying and packaging operations. For this reason the cereal product and soup base are preferably dried to moisture contents less than the critical values and the humidity of the atmosphere in which the packaging operations are conducted is controlled so that said moisture contents do not exceed said critical values when the products are actually packaged and sealed. It is preferred to have the relative humidity of said atmosphere maintained below about 50 per cent.

In other words, a margin of safety is preferably provided by drying the separate ingredient, e. g., the noodles below the moisture content which would reduce the moisture of the soup base or other heat-sensitive composition below the critical percentage, i. e., below 1.5 per cent for the soup base in the composition given above. This margin is desirable not only in connection with preventing undue moisture absorption during packaging but also in transportation and storage because even well sealed packages may admit some moisture on long standing, especially in humid atmosphere. A margin of about 2 per cent appears sufficient for the cereal product, i. e., in the example given the noodles are dried to 6 per cent whereas 8 per cent would be sufficient to take up the ordinary moisture content of the soup base. A larger margin of safety may be provided by drying to even lower moisture content, but this appears not to be necessary.

The cereal product may vary widely in its specific character. Noodles, rice, barley, lentils, peas, beans, etc., are most likely to be chosen because they are most commonly used in soups.

The soup base may also vary widely in specific composition, but will be characterized, if this invention is to be used, by the presence of an ingredient or ingredients, such as the amino acid material and sugar, which is seriously deteriorated by ordinary conditions of accelerated drying.

By my invention at least one ingredient is included in the final composition which is not deteriorated by ordinary conditions of drying and which has a relatively low water vapor pressure for a given moisture content; and such ingredient is separately dried to a moisture content at which it will take up moisture from the sensitive ingredients until their sensitivity is destroyed thereby.

The term amino acid material is generic and covers not only the numerous specific amino acids, salts and derivatives thereof, e. g., glutamic acid and salts thereof but also various proteins, protein degradation products or hydrolysates.

What is claimed is:

1. A packaged food composition adapted to make soup and comprising a soup base including amino acid material and carbohydrate material, said base having an initial moisture content not exceeding about 1.5 per cent by weight, another edible ingredient which is capable of accelerated drying by elevated temperature without deterioration and having its initial moisture content not exceeding about 8 per cent by weight to rob moisture from said soup base through the atmosphere within the package whenever its moisture content tends to exceed said critical value and a container enclosing said base and pre-dried ingredient and sealing them substantially moisture-tight from contact with the atmosphere.

2. A packaged food composition adapted to make soup and comprising a soup base including a salt of glutamic acid and dextrose, said base having an initial moisture content not exceeding about 1.5 per cent by weight, a mass of noodles having an initial moisture content not exceeding about 8 per cent by weight and a container enclosing said soup base and noodles and sealing them from contact with the atmosphere.

3. The process of making a packaged noodle soup mix which comprises drying a soup base including glutamic acid material and dextrose to a moisture content of at most about 0.75 per cent, drying noodles to a moisture content of about 6 per cent, packaging said materials together in sealed packages and carrying out the packaging operations in an atmosphere having not more than about 50 per cent humidity.

STEPHEN L. GALVIN.

REFERENCES CITED

The following references are of record in the file of this patent:

UNITED STATES PATENTS

| Number | Name | Date |
|---|---|---|
| 2,270,582 | Esselen | Jan. 20, 1942 |
| 2,278,466 | Musher | Apr. 7, 1942 |
| 2,373,805 | Barker | Apr. 17, 1945 |

FOREIGN PATENTS

| Number | Country | Date |
|---|---|---|
| 288 | Great Britain | 1873 |

OTHER REFERENCES

"Packaging Requirements for Dehydrated Vegetables," by Pitman et al., Food Industries, January 1943, pages 49 to 52.